United States Patent [19]

Cheng et al.

[11] 3,949,104

[45] Apr. 6, 1976

[54] STARCH CONTAINING CONCENTRATES

[75] Inventors: Hsiung Cheng, Decatur; Carl O. Moore, Rochester, both of Ill.

[73] Assignee: A. E. Staley Manufacturing Company, Decatur, Ill.

[22] Filed: Jan. 20, 1975

[21] Appl. No.: 542,150

[52] U.S. Cl. .............. 426/578; 426/579; 426/589; 426/569; 127/33; 106/5; 106/214; 424/361
[51] Int. Cl.² .................. A23L 1/187; A23L 1/195
[58] Field of Search ........ 426/578, 579; 127/29, 32, 127/38, 33

[56] References Cited
UNITED STATES PATENTS

| | | | |
|---|---|---|---|
| 3,617,383 | 11/1971 | Thurston | 127/32 |
| 3,620,842 | 11/1971 | Germino | 127/32 |

*Primary Examiner*—Jeanette M. Hunter
*Attorney, Agent, or Firm*—M. Paul Hendrickson; Charles J. Meyerson

[57] ABSTRACT

The invention encompasses intermediate, starch-containing products in which the starch thickening capacity is inhibited by an aqueous dispersant system. These intermediate products can be readily converted into a starch thickened end-product by combining the intermediate product with additives which dissipate the inhibitory effect of the aqueous dispersant. The intermediate products may be provided as a concentrate which contains cold-water swelling starch granules suspended in an aqueous media adapted to effectively maintain the starch granules in an unswollen form. The intermediate products may be suitably formulated with all the desired recipe ingredients except the amount of water needed to convert it into a starch thickened end-product.

32 Claims, No Drawings

STARCH CONTAINING CONCENTRATES

BACKGROUND OF THE INVENTION

Starches are extensively used as a thickening agent for a variety of aqueous based products (e.g., cosmetics, pharmaceuticals, industrial and food products). Unmodified and pregelled starches from a variety of starch sources such as tapioca, corn, high amylose, sweet potato, potato, waxy maize, canna, arrowroot, sorghum, waxy sorghum, waxy rice, sago rice, etc. have been employed as thickening agents. Starches are frequently modified or derivatized with a host of chemical reagents to alter its functional properties. An infinite number of product variations can arise by simply altering the product's starch component.

A consumer of starch thickened products can typically select either an inexpensive, inconvenient, starch-containing dry mix or a convenient, expensive, ready-to-use product. These two approaches to the marketing starch-containing products are illustrated by the manufacture and distribution of starch-containing food products.

Directly consumable, aqueous based starch food products are convenient, but prone to degradative changes (e.g., microbial, enzymatic, chemical and/or physical spoilage). Due to manufacturing, packaging, distribution costs and other difficulties therewith, the ultimate customer will normally pay more for these directly consumable starch products.

Starch-containing, dry food mixes are more easily manufactured and distributed to the trade as well as being quite stable against degradation. The consumer, however, has the inconvenience of converting the starch along with the other mix ingredients into the desired end product. If the prescribed recipe is not followed, the desired end product will not be prepared. If the recipe does not include a cooking step, a cold-water dispersible starch (e.g., pregelled starch) is generally employed. When the recipe entails cooking, either a modified or an unmodified starch may be used.

In U.S. Pat. No. 3,770,461 by A. P. Stewart et al., a process for preparing a directly consumable fruit pudding product is disclosed. Fruit puddings are highly acidic. The Stewart et al. patentees disclose that when the starch was heated and sterilized in the presence of fruit pudding acidulents, its thickening properties were destroyed. To obviate this problem, the patentees separately heat sterilize an aqueous starch portion and the acidulent portion, cool both portions and combine both portions to provide the desired ready-to-eat fruit pudding product. British Patent No. 1,304,519 discloses an atypical starch-containing food product. Although this product contains water, the British patentees utilize a starch system wherein a starch is coblended with an aqueous sugar medium. The ultimate consumer thereof mixes the aqueous coblend with boiling water and/or boiling milk to provide a cooked, thickened food product. This particular recipe allegedly overcomes the balling and/or lumping effect frequently encountered in preparing puddings which contain a pregelled starch while affording a microbiologically stable food product.

The inventors sought a starch-containing product which would combine the desirable attributes of the starch-containing dry mixes and the aqueous-based, ready-to-consume products. Such a product would desirably avoid the aqueous-based starch product's susceptibility to degradative changes. It was further desirable to avoid the inconvenience of the dry mix recipes, and particularly finding a recipe which would not require a cooking step to thicken the starch while providing greater recipe tolerance and uniformity in achieving the desired starch thickened effect. Such a product would provide the consumer with an alternate means for preparing starch-thickened products at a more advantageous cost.

OBJECTS

It is an object of the present invention to provide a starch-containing, aqueous concentrate which will convert into a starch-thickened product when other additives are admixed therewith.

Another object of the invention is to provide a novel and improved method for preparing starch-thickened products.

A still further object is to provide a concentrate which contains a stable, abeyant starch thickening agent in an aqueous dispersant.

Another object of the present invention is to provide a fluid food concentrate which, upon the addition of cold water, will convert into a relatively non-fluid or gelled food mass.

DESCRIPTION OF THE PRESENT INVENTION

According to the present invention, there is provided a concentrate which, upon formulation with other additives, is adapted to provide a starch-thickened product, said concentrate comprising:

a. a birefringent, granular, cold-water swelling starch, said granular cold-water swelling starch being characterized as exhibiting within ten minutes a loss of birefringency when 1% by weight of the cold-water swelling starch is dispersed in water at a temperature of less than 120°F.; and b. an aqueous dispersant comprised of water and starch swelling inhibitor, said concentrate containing at least one part by weight water for each six parts by weight of cold-water swelling granular starch with the amount and proportion of water and starch swelling inhibitor within said concentrate being sufficient to substantially maintain the starch granules therein in a non-thickened and granular form.

The aqueous concentrates of this invention rely upon a specific type of starch which in combination with the dispersant functions as an abeyant starch thickening agent. By combining the concentrate with other additives which dissipate the inhibitive effect of the inhibitor system, the concentrate granules will swell and thicken and thereby provide the desired starch-thickened end product.

In the absence of the starch swelling inhibitor, the starch component employed herein will rapidly swell in cold water and provide a thickened product. The granular character of the cold water starches employed in this invention can be identified by dispersing the cold-water-swelling starches in mineral oil (at 1% by weight starch concentration and 20°F.) and microscopically examining the dispersed starch granules under polarized light. When microscopically examined under these polarized light conditions, these mineral oil dispersed starches will typically reveal more than 80% of the starch granules as having birefringency. Concentrates exhibiting improved properties are achieved by utilizing those cold-water swelling starches having at least 90% granular birefringency, and preferably with those wherein substantially all of the starch granules possess birefringency (more than 95%) when microscopically examined under these polarized light conditions.

The cold-water swelling starch component can be prepared by modifying granular starches with chemical reagents to provide a granular, modified food starch which will swell and readily disperse in water at temperatures of less than 120°F. Illustrative processes for preparing these starches may be found in U.S. Pat. Nos. 2,516,634 and 2,845,417 both by Kesler et al., 3,070,594 by Harris et al., 2,865,762 and 2,884,412 both by Neukom, 3,705,891 by Tuschhoff et al. and 3,725,386 by Hanson et al. The cold-water swelling starches herein may be prepared from a variety of granular starches such as corn, wheat, tapioca, sorghum, waxy maize and high amylose starches as well as certain modified food starches as taught in U.S. Pat. Nos. 3,725,386 and 3,705,891.

Hydroxypropylated starch granules prepared in accordance with U.S. Pat. Nos. 3,705,891 and 3,725,386 are particularly well suited as a cold-water swelling starch component herein. Particularly useful are the hydroxypropylated granular starches having an average hydroxypropyl degree of substitution (D.S.) of more than 0.1 (advantageously between about 0.15 and about 0.5 D.S.) and most preferably those having a D.S. between about 0.17 to about 0.25.

The granular, cold-water swelling starches employed in this invention also have the common property of exhibiting a loss of birefringency when dispersed (1% by weight starch solids level) in water at temperatures below 120°F. These cold-water swelling starches herein characteristically lose their birefringency within 10 minutes within 10 minutes after being dispersed in water at temperatures between 40°F. and 120°F. Some will swell and exhibit a birefringency loss below 40°F. (e.g., 35°F.) as well as within the 40°–120°F. range. Others may require a temperature of 100°F. or more to effectuate a loss of birefringency. The more highly derivatized, cold-water swelling starches usually exhibit more rapid swelling in cold-water and concomitant loss of birefringency therein while those derivatized to a less degree normally require higher temperatures and a longer time interval. Cold-water swelling starches which swell in water (at 1% concentration) at temperature of about 90°F. or less and lose their birefringency in less than about 5 minutes are advantageously used. Those cold-water swelling starches evincing a loss of birefringency in less than 5 minutes at dispersion temperatures of less than about 75°F. (e.g., especially at about 35°F. to about 65°F.) are particularly effective herein as an abeyant starch thickening compartment.

Commercially available, cold-water swelling starches identified as NU-COL 231, NU-COL 326 and NU-COL 4227 (manufactured and sold by the A. E. Staley Manufacturing Company, Decatur, Ill.) will typically respectively achieve a maximum uncooked Brookfield viscosity (5% by weight dry solids level, pH 6.5, at 23°F.) within 2 to 3 minutes (about 9,000 cps.), 3 to 5 minutes (about 5,500 cps.) and 1 to 2 minutes (about 9,500 cps.). Each of these starches also has excellent viscosity stability as evidenced by typical 10 minutes and 24 hour viscosity readings respectively of 9,000 cps. and 7,000 cps., 5,500 cps. and 4,800 cps. and 9,500 cps. and 9,500 cps. These cold-water swelling starches are particularly useful in the present concentrates.

The cold-water swelling starches employed in this invention differ from unmodified or inhibited granular starches by their capacity to swell and lose their birefringency in aqueous systems at relatively low temperatures (e.g., 120°F. or less). Unmodified, inhibited and slightly derivatized granular starches normally require pasting temperatures well in excess of 125°F. and characteristically retain their granular and birefringent character throughout the 40°F. to 125°F. range for 10 minutes or more. To effectuate a loss of birefringency, these unmodified starches require cooking at temperatures above their gelation point.

These cold-water swelling starches also differ from pregelled starches. Pregelled starches neither possess a birefringent character nor a granular starch structure.

In the concentrates, the starch inhibitors in combination with the water maintain the cold-water swelling starch component essentially in the unswollen and non-viscous form. This may be accomplished by a plurality of modes which effectively prevent the starch granules from imbibing water. Certain inhibitors appear to form complexes with the cold water starch granules at a relatively low concentration and thereby effectively prevent the starch from swelling. Other starch inhibitors, in combination with the water, form saturated solutions which effectively reduce the available free water to a level sufficiently low enough to prevent the starch from swelling therein. Similarly, hydrocolloids which preferentially absorb water of the concentrate (e.g., elastic gels) may be used. The aqueous dispersant may utilize a single inhibitor or combination of inhibitors.

A wide variety of organic and inorganic compositions which, as a class, inhibit the ability of the cold-water swelling starch from imbibing water and developing its peak viscosity can be employed as a starch swelling inhibitor. Compositions which tend to increase the gelatinization temperature of native starch granules will normally have an inhibitory effect upon the cold-water swelling starches herein. The efficacy of the various inhibitors and the amount required in the concentrate to inhibit the cold-water swelling starches from imbibing water will vary considerably. Some inhibitors are ineffective when employed alone but will in combination with other ingredients provide an aqueous dispersant system which will prevent the granules from imbibing water.

A suitable test procedure for determining whether or not a particular aqueous dispersant will effectively inhibit the cold-water swelling starches from imbibing water and imparting viscosity thereto is to ascertain its viscosity character with a test sample which contains 5 parts by weight dry starch solids for each 24 parts by weight water of the aqueous dispersant (i.e., the aqueous inhibitory system to be tested). If the aqueous dispersant inhibits the starch at this level from swelling (as evidenced by its viscosity at one hour and 16 hours when stored and tested at 20°C.), the aqueous inhibitory system will, as a general rule, be effective for concentrates which are formulated with equivalent or diversant amounts of cold-water swelling starch. As a rule, the aqueous inhibitor systems in combination with cold-water swelling starch therein are quite viscous. In order to ascertain whether or not the cold-water swelling starch is functioning essentially as a non-thickener therein, the viscosity characteristics of cold-water swelling starch containing test sample can be compared with test samples having an identical formulation excepting for the substitution of the cold-water swelling starch therein with an equivalent amount of a pregelatinized waxy maize starch and another sample which contains an unmodified, regular dent corn starch. A properly formulated aqueous inhibitor system (i.e., aqueous concentrate phase) will provide comparable viscosity readings for the test samples which contain the cold-water swelling starch and the unmodified regular dent corn starch (i.e., unmodified, granular, regular dent corn starch). In contrast, the aqueous inhibitor systems as employed in the concentrates of this invention are, as a general rule, ineffective inhibiting and preventing the pregelatinized, waxy maize starch from hydrating and imparting a substantial starch thickening effect to the tested sample thereof.

On a comparative basis, a concentrate with an effective aqueous starch inhibitor in combination with the cold-water swelling starch will provide test sample viscosity values substantially comparable to the test sample which contains, as a cold-water swelling starch test sample substitute, an equivalent amount of unmodified, granular corn starch. The starch component in each of these test samples will essentially function as a non-thickener. In contrast, the test sample which contains the pregelatinized, waxy maize starch will typically exhibit a viscosity value of at least two-fold greater (usually at least three times greater) than those test samples which contain an equivalent amount of either the unmodified, granular corn starch or cold-water swelling starch (as determined by Brookfield viscosities one hour after preparation of test samples maintained at 20°C. and tested at 20°C.).

An effective aqueous starch inhibitor system upon storage will also effectively prevent the cold-water swelling starch from imbibing water and imparting a starch thickening effect to the test sample as evidenced by its comparative viscosity attributes. In contrast thereto, the test sample containing the pregelatinized, waxy maize will typically exhibit a several fold viscosity increase upon storage at 20°C. (e.g., the 16 hour viscosity value comparative to its 1 hour test value typically results in a 10–30 fold viscosity increase). Although the corresponding test sample containing the cold-water swelling starch may be substantially stable against a viscosity increase upon such storage, the pregelatinized waxy maize test sample viscosity readings when compared to the cold-water swelling starch test sample reading provides a basis for ascertaining the effectiveness of any given aqueous inhibitory system (i.e., pregelled test sample reflects viscosity values comparable to a starch thickened concentrate). In selecting a suitable aqueous inhibition system for the cold-water swelling starches of this invention, the viscosity change in the test sample after storage under ambient conditions (e.g., 20°C.) from one hour to 16 hours is therefore a useful test procedure for ascertaining whether or not the aqueous dispersant system effectively inhibits the cold-water swelling starch from imbibing water. Under these test conditions, those aqueous dispersants which evince stability against any appreciable viscosity increase are most suitably used in practicing this invention. A 16 hour viscosity reading which is two times greater than the one hour viscosity determination generally indicates the aqueous inhibitor system is ineffective. For most applications, the aqueous inhibitory dispersant herein will effectively prevent the 16 hour test sample viscosity from increasing to a viscosity value of more than 25% from its one hour viscosity reading. Advantageously, the test sample viscosity increase will be less than 10% with those aqueous dispersants providing a viscosity increase of no more than a 5% increase or less being preferred herein.

Illustrative inhibitors, soluble to some degree in the concentrate, include compositions such as alcohols, proteinaceous materials, organic acids and salts, carbohydrates including the saccharides, lipids, acetates, aldehydes, ketones, halo and nitroaliphatic and aromatics, organic thiols, surface active agents, inorganic metal salts, mixtures thereof and the like. Mono and polyhydroxy organics such as methanol, ethanol, propanol, 1-butanol, amyl alcohols, 2-octanol, cyclohexanol, decanol, cetyl alcohol, tri and dihydroxybenzyl alcohols, phenol, naphthol, glycols, pinacols, 2-butoxyethanol, 2-chloroethanol, 2-ethoxyethanol, glycerol, polypropylene glycol, polyethylene glycols, erythriol, arabitol, hexitol, lauryl alcohol, the sugar alcohols (e.g., mannitol, sorbitol, etc.), alcohol acids (e.g., 1-hydroxypropionic acid, glyceric acid, erythric acid, dihydroxysuccinic acid, saccharic acid, tropic acid), the alcoholic aldehydes and ketones, saccharide materials such as starch hydrolyzates (e.g., corn syrup, dextrins, maltodextrins, dextrose and maltose); fructose, rabinose, sucrose, lactose, invert sugar containing materials such as molasses, honey, brown sugar, papalon, concentrated fruit juices, mixtures thereof and the like may be used as inhibitors.

Other polar organic inhibitors which do not adversely affect the abeyant thickening ability of the concentrate starch granules such as nitro substituted aliphatic and aromatics (e.g., nitro ethane, nitro benzene, nitropropanes, etc.), organic esters (e.g., ethyl and amyl acetate, methyl propionate, ethyl propionate, ethyl butyrate, octyl acetate, amyl butyrate), fatty esters such as glyceryl tripalmitate, and or tristerates and/or trioleates, phosphate esters such as triethyl and tributyl phosphates, triglycerol phosphate, lecithin, alkyl sulfates, etc. may be used. Emulsifiers or surface active agents such as the partial fatty acid esters of glycerol or hexatol anhydride or polyoxyalkylene as described in U.S. Pat. No. 3,620,763 by R. G. Hans, sulfated fats and oils such as the metal salts of sulfated fatty acids (e.g., the alkaline and alkaline earth metal salts of 10–18 carbon fatty acids), sucrose monostearate, sodium dioctyl and dodecylsulfosuccinate, mixtures thereof and the like may also be used. If desired, other organic inhibitors such as ketones (e.g., isopropyl ketone, methyl ethyl ketone), quinolines, pyridenes, alkyl mercaptans, (e.g., butyl mercaptan), aldehydes, simple proteins (e.g., albumins, globulins, prolamines, glutelins, etc.), scleroproteins (e.g., histones and protamines), conjugated proteins (e.g., nucleoproteins, glycoproteins, etc.), phosphoproteins, chromoproteins, the neutral, basic and acidic amino acids and the salts thereof (e.g., monosodium glutamate), hydrolyzed proteins, organic acids (e.g., edible acidulents)[1] and organic acid salts, mixtures thereof and the like may be used separately or in conjunction with other inhibitors to inhibit the concentrate starch granules from imbibing water.

1 - e.g., see Chapter 5, Handbook of Food Additives, 2nd edition, CRC Press.

Many of the metal salts of organic and inorganic acids also suppress or inhibit the cold-water swelling starches herein from thickening aqueous mediums. These metallic salts may also be used alone as an inhibitor or with other inhibitors. Illustrative thereof are the alkaline earth and alkali metal halides, phosphates and sulfates (e.g., calcium, potassium and sodium chloride, sodium sulfate), cuprammonium hydroxide, mono or bis ethylene diamine copper (II), percursors of aluminum, barium, bismuth, chromium, cobalt, iron manganese, nickel, strontium, tin and zinc cationics, percursors for arsenite, borate and tellurate, molybdate, tungstate, germanate ions, D-glucamines, cupric chloride and sulfates, aluminum hydroxide, titamyl sulfate, etc. Likewise, hydrocolloids and gums which imbibe and retain a sufficient amount of water from the concentrate may be used in combination with other inhibitors to maintain the cold-water-soluble starch component essentially in the granular form (e.g., see the Handbook of Food Additives, 2nd edition, CRC Press on pages 295–359).

The total amount of water in the concentrate can vary considerably. For fluid concentrates, this will generally require at least 10% by weight water (based upon the total concentrate weight) and most typically, more than 15% or 20% by weight water. The maximum weight percent water in the concentrate will depend primarily upon effectiveness of the inhibitor. For example, sodium sulfate at a level of about 10 parts by weight for each 100 parts by weight of concentrate water will effectively maintain the cold-water swelling starch component essentially in the granular form. Other inhibitors are still more effective than sodium sulfate and, accordingly, permit a greater weight percent of concentrate water to be used. In contrast, the water-soluble saccharides such as the fermentable sugars (e.g., dextrose, maltose, maltotriose, sucrose) are less effective on a weight basis and normally require at least 150 and preferably greater than about 200 parts by weight for each 100 parts by weight of concentrate water. In the more limited embodiments of this invention, the weight percent of water in the concentrate will usually range between about 15 to about 50 weight percent and preferably between about 20 to about 30 weight percent.

The amount of cold-water swelling granular starch provided in the concentrate will usually depend largely upon the degree of starch thickening which is desired in the ultimate end product thereof. For most applications, the cold-water swelling granular starch component will usually be more than about 35 parts by weight granular starch for each 200 parts by weight concentrate water. Advantageously, the concentrates (particularly food concentrates) will contain a weight ratio of cold-water swelling starch to water from about 1:3 to about 3:1 with the preferred weight ratio thereof being between about 1:2 to about 2:1.

The cold-water swelling starch component imparts substantially the same rheological properties to the concentrate as a concentrate would which has an equivalent weight of unmodified starch substituted therefore (e.g., comparable flow and viscosity characteristics) with both starches functioning essentially as a non-thickener. It is advantageous to select as an inhibitor those ingredients which are compatible with the formulation of the desired, starch-thickened, end-product. If it is desired to prepare an edible food product, its ultimate recipe will normally contain food ingredients which will function as inhibitors. For example, many food products rely upon sugars. These sugars with a minor portion of the total amount of water required in its ultimate end product recipe can be used to provide a saturated sugar solution having sufficiently low $A_w$ (i.e., free water) factor to effectively inhibit the starch granule from swelling and imparting any appreciable viscosity to the concentrate. Similarly for industrial application, starch swelling inhibitors compatible with its ultimate end usage may be employed in formulating the concentrates herein.

The concentrates of this invention are generally useful as an intermediate product for preparing those consumable products which typically employ starch as a thickening agent. The liquid concentrates of this invention are adaptable to a broad spectrum of edible and inedible products (e.g., cosmetics, pharmaceuticals, polishes, chemicals, paints, adhesives, printing, animal feeds, foods, alcoholic and non-alcoholic beverages, paper, textiles, etc.).

The aqueous concentrates of this invention are advantageously formulated to contain at least a major portion (on a solids weight basis) and preferably essentially all the desired recipe ingredients excepting the required amount of water needed to convert it into a thickened starch product. As such, the aqueous dispersant can be utilized as a carrier for other desired ingredients. For example, in preparing edible concentrates which are adapted to be converted to a complete and thickened recipe upon dilution in an aqueous media, conventional recipe ingredients such as edible color and flavor additives, sweeteners, acidulents, nutritive supplements, texturizers, thickeners, stabilizers, salts, lipids, preservatives and the like may be included, depending upon the ultimate and desired starch thickened product.

The aqueous concentrates of this invention are particularly adapted to provide starch thickened food recipes which contain either water-soluble salts or water-soluble proteinaceous materials or water-soluble saccharides (e.g., starch hydrolyzates, mono, di and tri saccharide) or mixtures thereof as the predominant solid recipe concentrate ingredients (weight basis). Edible, starch thickened food products containing fermentable sugars (e.g., mono, di and trisaccharides) as the predominant recipe solid (preferably the major solid on a weight basis) are most suitably adapted to this invention. For many of these food recipes, the concentrate can be conventionally formulated so that it possesses fluidity but the concentrate will, upon the addition of water thereto, convert into a starch thickened end product.

In preparing the concentrates of this invention, it is important to initially prepare the aqueous dispersant with the required amount of inhibitors before admixing or incorporating therein the cold-water swelling granules. If the starch granules are permitted to swell in the absence of the inhibitor, the granules cannot be effectively reconverted to the unswollen form. Accordingly, the aqueous-based concentrates are generally prepared by providing an aqueous dispersant which contains a sufficient amount of inhibitor to maintain the cold-water swelling starch component essentially in the granular form. The dry, granular cold-water swelling starch component is then added and uniformly dispersed into the inhibited aqueous dispersant. By this method, the aqueous dispersant lacks the necessary amount of water to hydrate the starch granules and thereby effectively inhibits the dry granules from swelling therein. A concentrate containing the granular starch component cannot be achieved if the starch is permitted to swell.

The starches employed in the concentrates are capable of imbibing a considerable amount of water. When water is added to these concentrates, the starch granules will swell and thicken the water diluted concentrate to the desired end product. Atypical of conventional starch systems, the fluid concentrates of this invention will normally exhibit an increase in viscosity when diluted with water. For example, concentrate ranging semi-solid or gelled products of a pudding consistency to a gravy consistency may easily be prepared by diluting a fluid concentrate with a volumetric ratio of concentrate to cold water ranging from about 1:1 to about 1:4.

The concentrates herein possess a plurality of advantages over dry mixes and ready-to-consume starch thickened products. The concentrates may be formulated with all the desired additives excepting those which enable the starch to thicken. By simply admixing those necessary additives which effectively disrupt the inhibitory effect of the aqueous dispersant, the concentrates are readily convertible into the desired end product without cooking. In the present invention, the aqueous dispersant can be effectively utilized as a carrier and dispersant for the cold-water swelling granule system. Unlike dry mixes (especially those which contain pregelled starches), the concentrates readily provide a uniformly starch thickened end product which is essentially free from unhydrated starch particles. Manufacturing, packaging and distribution costs can be substantially reduced because the concentrates may be suitably formulated with an ingredient system inherently less susceptible to microbial, enzymatic, chemical and/or physical degradation. The concentrates may be suitably formulated with a relatively small amount of water which advantageously provides substantial savings in capital equipment expenditures (e.g., reduces bulk processing), asceptic and distribution requirements, packaging and shipping costs (e.g., reduction in package size and weight), etc.

The starch component as provided in the concentrate is thermally stable against losing its thickening capacity over a relatively broad temperature range. If desired, the concentrates may be frozen, subsequently thawed and used to prepare the finished product without adversely affecting the starch thickener. The concentrates are easily reconstituted in cold aqueous mediums (e.g., refrigerated milk or cold tap water) under nominal mixing to provide a directly consumable product. End product failures are substantially avoided because of the form the starch is provided in the concentrate and the recipe whereby it is converted into a starch thickened product. Similar to the concentrate, the reconstituted concentrates may be suitably formulated so that they may be frozen, refrigerated or cooked (e.g., boiled or simmered) without having a deleterious effect upon the starch thickener when properly formulated. The consumable products are stable against weeping and phase separation (e.g., syneresis).

EXAMPLE 1

A liquid orange pudding concentrate was prepared by dissolving 176 pounds of sucrose in 249 pounds of orange juice concentrate (50°Brix) at 140°F. The sucrose-orange juice solution was then cooled to 72°F. and 74.5 pounds of a cold-water swelling starch[2] was uniformly admixed therein to provide a fluid, orange pudding concentrate. The resultant pudding concentrate was comprised of an internal phase of the cold-water swelling starch granules uniformly dispersed within a continuous external phase of the sucrose-orange juice solution. The saturated orange juice concentrate effectively prevented the cold-water swelling starch from imbibing water and imparting any appreciable starch thickening effect to the concentrate. The orange pudding concentrate possessed flow characteristics similar to a thick table syrup. The pudding concentrate could be refrigerated, frozen or stored at room temperature over prolonged periods of time without degrading (e.g., microbial, enzymatic, chemical and/or physical degradation) the functionality of the cold-water swelling starch component. The concentrate was stable against phase separation (e.g., syneresis) and could be frozen and thawed without adversely affecting the starch thickening properties of the cold-water swelling starch component.

[2] NU–COL–231 — A partially inhibited, hydroxy propylated granular corn starch manufactured by A. E. Staley Manufacturing Company.

A fruit pudding was prepared from the pudding concentrate by uniformly admixing together (manual spoon mixing) under ambient conditions, one part by weight pudding concentrate with two parts by weight cold water (65°F.). When the water was initially admixed into the pudding concentrate, the admixture viscosity was considerably less than that of the pudding concentrate. After two minutes of spoon mixing, the uniform fruit pudding admixture was transferred to serving containers. The pudding servings set up rapidly and within 5 minutes the cold-water swelling starch component had become fully hydrated and thickened the reconstituted product to the desired fruit pudding consistency. The fluid character of the admixture immediately following the spoon mixing step and its subsequent thickening to pudding consistency after standing for an additional three minutes illustrates that cold-water swelling starch had continued to imbibe water until the desired starch thickening effect had been achieved in the end product.

The fruit pudding servings were firm and smooth and had excellent eating and textural characteristics (e.g., short texture character, good body and mouthfeel and free from lumpiness, unhydrated starch particles, sliminess and pastiness). The fruit puddings did not weep or separate upon standing for a prolonged period of time under ambient conditions. The puddings also possessed satisfactory freeze-thaw properties.

EXAMPLE 2

This example illustrates the preparation of other food concentrates in which the starch component therein is essentially a non-thickener but upon admixture with an aqueous media converts into a starch thickened ready-to-eat food product. In preparing each of the following food concentrates, the dry solid ingredients (excepting the cold-water swelling starch) were dry blended and then dissolved in water (140°F.) by mixing. For those concentrates containing corn oil, the oil was uniformly dispersed into hot, aqueous medium after dissolving the solids therein. The resultant hot aqueous medium, containing the dissolved solids, was cooled to 72°F. and the cold-water swelling starch was then uniformly admixed therein as in Example 1.

| A. Liquid Vanilla Pudding Concentrate Ingredients | % by Weight |
|---|---|
| Sugar | 60.6 |
| Water | 22.7 |

-continued

A. Liquid Vanilla Pudding Concentrate

| Ingredients | % by Weight |
|---|---|
| Cold-Water Swelling Starch[2] | 14.4 |
| Tetrasodium Pyrophosphate Hydrate | 1.5 |
| Disodium Phosphate | .75 |
| Vanilla Flavoring | .05 |
|  | 100.00 |

[2]Supra

To prepare the desired vanilla pudding from the above concentrate, four parts refrigerated milk and one part concentrate were uniformly blended together by spoon mixing and allowed to stand until it thickened to the desired consistency. In this pudding concentrate, the milk protein reacts with the pyrophosphate and phosphate and swollen hydrated starch system to collectively (e.g., see U.S. Pat. No. 2,801,924) impart the desired gelled consistency to the end product. As in Example 1, the reconstituted concentrate continued to imbibe water and develop viscosity immediately following the mixing step. The performance and attributes of the concentrate and end product were similar to those reported in Example 1.

B. Liquid Chicken Bouillon Concentrate

| Ingredients | % by Weight |
|---|---|
| Instant Chicken Bouillon Solids | 42 |
| Sugar | 5 |
| 42 D.E. Corn Syrup Solids | 9 |
| Water | 22 |
| Corn Oil | 7 |
| Cold-water Swelling Starch[2] | 15 |
|  | 100.0 |

[2]Supra

The chicken bouillon end product was prepared by admixing together nine parts by weight of water with one part by weight of bouillon concentrate. The reconstituted product was then heated to a serving temperature. The bouillon product had excellent eating and textural attributes.

C. Liquid Beef Gravy Concentrate

| Ingredients | % by Weight |
|---|---|
| Instant Beef Bouillon Solids | 21 |
| Non-Fat Milk Solids | 6 |
| Sugar | 5 |
| Corn Syrup Solids (42 D.E.) | 19 |
| Water | 22 |
| Corn Oil | 7 |
| Cold-Water Swelling Starch[2] | 20 |
|  | 100.0 |

[2]Supra

A beef gravy was prepared from the concentrate by admixing one part by weight concentrate into five parts of boiling water (cold water may be used if desired). The beef gravy was not lumpy and had the mouthfeel and flow characteristics of a high quality beef gravy.

D. Liquid Chocolate Milk Shake Concentrate

| Ingredients | % by Weight |
|---|---|
| Cocoa Powder | 7.4 |
| 42 D.E. Corn Syrup Solids | 8.4 |
| Cold-Water Swelling Starch[3] | 17.0 |
| Sugar | 49.0 |
| Water | 18.2 |
| Color and Flavor | trace |
|  | 100.0 |

[3]NU-COL 4227, a non-crosslinked, hydroxypropylated, granular corn starch product manufactured and sold by the A. E. Staley Manufacturing Company.

To prepare the desired milk shake product, six parts cold milk (47°F.) and one (ppw) milk shake concentrate (at 47°F.) were placed in a sealed container and hand shaken until well mixed. Within less than about 2 minutes, the reconstituted and mixed product had thickened to the consistency of a good quality milk shake. The product was directly consumable as well as being adapted to be refrigerated or frozen for future use without adversely affecting the properties of the starch thickener.

E. Vanilla Milk Shake Concentrate (Paste Form)

| Ingredients | % by Weight |
|---|---|
| Non-Fat Milk Solids | 21.1 |
| Sugar | 33.9 |
| 42 D.E. Corn Syrup Solids | 16.9 |
| Cold-Water Swelling Starch[3] | 8.5 |
| Water | 19.6 |
| Color and Flavor | trace |
|  | 100.0 |

F. Chocolate Milk Shake Concentrate (Paste Form)

| Ingredients | % by Weight |
|---|---|
| Dutch Processed Cocoa | 7.2 |
| Sugar | 49.5 |
| 42 D.E. Corn Syrup Solids | 16.4 |
| Cold-Water Swelling Starch[3] | 8.6 |
| Water | 18.3 |
| Color | trace |
|  | 100.0 |

[3]Supra

In contrast to the syrup-like concentrates A-D above, milk shake concentrates E and F were formulated to a paste consistency. Concentrates E and F, however, possessed sufficient fluidity to be dispersed from a flexible container such as commonly used for tooth pastes. Milk shakes were prepared therefrom in accordance with the methodology of 2 E above to provide comparable results.

G. Base Liquid Concentrate Formulations

The following base concentrates containing the following ingredients were prepared in accordance with the methodology of Example 1.

| Ingredients | Formula I Parts by Weight | Formula II Parts by Weight |
|---|---|---|
| Cold-Water Swelling Starch[4] | 100 | 400 |
| 67 Brix Liquid Sucrose | 300 | 298 |
| 64 D.E. Corn Syrup (84% dry solids) | 600 | — |
| Fructose-Dextrose Syrup (ISOSWEET 100 - 71% dry solids) | — | 281 |
| Water | — | 21 |

| Ingredients | Formula I Parts by Weight | Formula II Parts by Weight |
|---|---|---|
| | 1000 | 1000 |

⁴Same starch as employed in Example 1.

In preparing the desired finished end product, an equivalent weight ratio of cold water and the Formula I concentrate were admixed and for Formula II there was admixed one part concentrate to each 6 parts by weight cold water with the, as desired, flavoring, coloring and other additives (e.g., fruit slices, cherries), being incorporated there during the admixing step. After achieving a uniform admixture, each product was allowed to stand for about 3–5 minutes to obtain the desired consistency. These concentrates are useful as a base in the preparation of products such as pastry and pie fillings, puddings, etc. with the ultimate preparer adding thereto those ingredients as desired to provide the completed recipe product.

Although Examples 1 and 2 illustrate food products which are prepared by diluting the concentrates with water, the concentrates are also useful in non-food products and in systems wherein the starch inhibition is dissipated by chemical additives other than water (e.g., inhibiting the cold-water soluble starches with a sodium and sulfate ion and then admixing chemical additives thereto which dissipate the concentrate salt-starch complex and thereby enable the starch to develop its thickening effect).

EXAMPLE 3

In this Example, a medium invert sugar (76% dry solids comprising approximately 50% sucrose, 25% dextrose and 25% fructose) was employed as an aqueous dispersant for samples containing either a cold-water swelling starch (NU-COL 231), an unmodified regular dent corn starch (granules) or a pregelatinized waxy maize starch (Gelatinized DURA-JEL). These samples were made by admixing the starch into the medium invert sugar. Viscosity determinations for the samples were made on a Brookfield viscometer at 20°C. with the spindles and revolutions per minutes (rpm) as indicated below:

Test 1 - (Uniform admixture of 2.5 parts starch and 100 parts medium invert sugar)

| Sample | 30 minute viscosity (20 rpm - No. 4 spindle) |
|---|---|
| 1. Cold-water swelling starch² | 2150 cps. |
| 2. Unmodified, regular dent corn starch granules | 1550 cps. |
| 3. Pregelatinized waxy maize | 2300 cps. |
| 4. Medium invert sugar - control | 1500 cps. |

²Supra

Test 2 - (Uniform admixture of 5 parts starch and 100 parts medium invert sugar)

| Sample | Viscosity (cps) 1 hr. | 16 hrs. |
|---|---|---|
| 5. Cold-water swelling starch² | 2,650 | 2,450 |
| 6. Unmodified, regular dent corn starch granules | 2,100 | 2,150 |
| 7. Pregelatinized waxy maize | 8,700 | 207,500 |
| 8. Medium invert sugar - control | 1,850 | 1,800 |

²Supra

The viscosity determinations in Test 1 were made 30 minutes after initial preparation. In Test 1, the viscosity reading for the concentrate containing the cold-water swelling starch (i.e., sample 1) was less than sample 3, which contains an equivalent amount of pregelatinized waxy maize starch. The capacity of the cold-water swelling starch component to thicken the concentrate of Sample 1 is inhibited by the aqueous medium invert sugar dispersant. Samples 1–3 were then individually diluted and uniformly mixed with an equivalent weight of water (20°C.). Upon dilution with water, the inhibited cold-water swelling starch of Sample 1 became functional as a hydrated colloidal thickener. The diluted Sample 2 mixture had a significantly lower viscosity than that of the diluted Sample 1 or 3 mixtures.

The Test 2 determinations being made one hour and sixteen hours after sample preparation. Except for the 16 hour viscosity Sample 7 determination (at 4 rpm with No. 6 spindle), the Test 2 viscosity determinations were made with a No. 4 spindle at 20 rpm. As evident from the substantial increase in viscosity at the 1 hour and 16 hour time intervals for Sample 7 (i.e., almost a 24-fold viscosity increase), the Sample 7 pregelatinized waxy maize starch continued to imbibe water from the invert sugar solution and thicken. In contrast, the cold-water swelling starch containing Sample 5 was inhibited by the sugar solutes, and did not thicken the sample concentrate upon standing for 16 hours (e.g., compare its 1 and 16 hour viscosities). As illustrated by the Test 2 viscosity data, the cold-water swelling starch component as provided in medium invert sugar will possess non-starch thickening attributes similar to Sample 6 which contains unmodified regular dent corn starch. When the samples (16 hours after preparation) are diluted with cold water (1:1 weight ratio), Sample 5 will become more viscous than either diluted Samples 6 or 7 admixtures with diluted Sample mixtures 5 and 7 having the viscosity characteristics of a starch thickened product while the diluted Sample 6 mixture has the character of an unthickened product.

What is claimed is:

1. A concentrate containing an abeyant starch thickener which upon formulation with additional ingredients is adapted to provide a starch thickened composition, said concentrate comprising:
   a. an internal phase of birefringent cold-water swelling starch granules, said starch granules characterized as exhibiting within ten minutes a loss of birefringency when 1% by weight of the cold-water swelling starch is dispersed in water at a temperature of less than 120°F., and
   b. a continuous external phase of an aqueous dispersant with said aqueous dispersant comprising water and a starch swelling inhibitor, said concentrate being further characterized as containing at least one part by weight water for each six parts by weight starch granules with the amount and proportion of water and starch swelling inhibitor in said concentrate being sufficient to inhibit the cold-water swelling starch granules from thickening said concentrate.

2. The concentrate according to claim 1 wherein the cold-water swelling starch granules are characterized as exhibiting a loss of birefringency in water at a temperature of less than 90°F.

3. An edible concentrate in accordance with claim 1 wherein the concentrate is a fluid concentrate which contains a weight ratio of cold-water soluble starch granules to water from about 1:3 to about 3:1.

4. An edible concentrate according to claim 1 wherein the concentrate contains from about 20 to about 50 percent by weight water and the starch granules are characterized as exhibiting a loss of birefringency when dispersed in water at a temperature of less than 75°F.

5. The concentrate according to claim 4 wherein the principal dry solids of said concentrate excluding the dry weight of the starch granules comprises the starch swelling inhibitor.

6. The concentrate according to claim 4 wherein the starch swelling inhibitor is at least solute selected from the group consisting of fermentable sugars, protein hydrolyzates, amino acids, amino acid salts and a metal salt of an inorganic acid.

7. The concentrate according to claim 4 wherein on a solids weight basis a fermentable sugar comprises the major inhibitor and the concentrate is further characterized as converting to a starch thickened composition when the concentrate is diluted and admixed with water at a temperature of less than 75°F.

8. The concentrate according to claim 7 wherein the concentrate contains a weight ratio of starch granules to concentrate water from about 1:2 to about 2:1.

9. The concentrate according to claim 8 wherein the concentrate contains from about 20 to about 30 weight percent water and more than about 200 parts by weight of a fermentable for each 100 parts by weight concentrate water.

10. The concentrate according to claim 9 wherein the concentrate is characterized as thickening into a more viscous composition than said concentrate when said concentrate is diluted and uniformly admixed with an equal weight of water at a mixing temperature within the range of 35°F. to 65°F.

11. In a food product which contains starch and substantially all the desired recipe solids to prepare a directly consumable food product upon hydration of the food product with water, the improvement which comprises a food product in a concentrate form, said concentrate comprising:
  a. an internal phase of birefringent, cold-water swelling starch granules, said starch granules being characterized as exhibiting within ten minutes a loss of birefringency when 1% by weight of the cold-water swelling starch is dispersed in water at a temperature of less than 120°F., and
  b. a continuous external phase of an aqueous dispersant, said aqueous dispersant comprising water and a starch swelling inhibitor with the starch granules of the internal phase being homogeneously dispersed and suspended within said continuous external phase, said concentrate being further characterized as containing at least one part by weight water for each six parts by weight starch granules with the amount and proportion of water and starch swelling inhibitor in said concentrate being sufficient to inhibit the cold-water swelling starch granules from thickening said concentrate.

12. The food product according to claim 11 wherein the concentrate contains from about 20 to about 50 percent by weight water and the weight ratio of cold-water swelling starch to water ranges from about 1:3 to about 3:1.

13. The food product according to claim 11 wherein the concentrate is characterized as thickening into a more viscous composition when said concentrate is uniformly admixed and hydrated with an equal weight of water at a mixing and hydration temperature of less than 75°F.

14. The food product according to claim 13 wherein the concentrate contains from about 20 to about 30 weight percent water and the major starch inhibitors on a dry solids weight basis comprises a fermentable sugar.

15. The food product according to claim 14 wherein the concentrate contains a weight ratio of starch granules to concentrate water from about 1:2 to about 2:1.

16. The food product according to claim 14 wherein at least 200 parts by weight of a fermentable sugar for each 100 parts by weight concentrate water.

17. The food product according to claim 16 wherein the concentrate is fluid and the concentrate thickens to a milk shake to pudding texture upon uniformly admixing and hydration thereof with about 1 to about 3 parts by weight water for each part by weight concentrate at a mixing temperature from about 35°F. to about 65°F.

18. The food product according to claim 17 wherein the concentrate solids consists essentially of the recipe solids of a pudding.

19. The food product according to claim 17 wherein the concentrate solids consists essentially of the recipe solids of a milk shake.

20. The food product according to claim 12 wherein the concentrate solids consists essentially of the recipe solids of a gravy.

21. A method for preparing a concentrate containing an abeyant starch thickener which upon formulation with additional ingredients is adapted to provide a starch thickened composition, which comprises the steps of:
  a. preparing an aqueous dispersant comprised of water and a starch swelling inhibitor wherein the proportion and amount of water and starch swelling inhibitor is sufficient to inhibit a granular, cold-water swelling starch from imbibing water and thickening the aqueous dispersant, wherein said granular cold-water swelling starch is characterized as being a birefringent starch and exhibiting a loss of birefringency within ten minutes when 1% by weight of the cold-water swelling starch is dispersed in water at a temperature of less than 120°F., and
  b. homogeneously dispersing the granular, cold-water swelling starch into the aqueous dispersant to provide a concentrate characterized as containing at least one part by weight water for each six parts by weight granular cold-water swelling starch with said aqueous dispersant forming a continuous external phase and the cold-water swelling starch granules are homogeneously dispersed therein and thereby provide a concentrate containing an abeyant starch thickener.

22. The method according to claim 21 wherein the prepared aqueous dispersant when tested by homogeneously dispersing therein 5 parts by weight of the cold-water swelling starch for each 24 parts by weight aqueous dispersant water is characterized as thickening into a more viscous composition upon dilution thereof and uniform admixture thereof with equal weights of water and aqueous dispersant at a mixing temperature within the range of 35°F. to 90°F.

23. The method according to claim 22 wherein the viscosity of a test sample as defined in claim 22 and which has been stored for 16 hours at 20°C. is no more than 25% of the viscosity of an equivalent test sample thereof which has been stored for one hour at 20°C.

24. The method according to claim 23 wherein the aqueous dispersant effectively inhibits the 16 hour test sample from exhibiting more than a 5% viscosity increase comparative to viscosity of the one hour test sample.

25. The method according to claim 21 wherein the prepared aqueous dispersant contains from about 20 to about 50 percent by weight water and from about 1 to about 3 parts by weight cold-water swelling starch for each part by weight water is homogeneously dispersed therein.

26. The method according to claim 22 wherein the aqueous dispersant comprises from about 20 to about 30 weight percent water and at least 200 parts by weight of a fermentable sugar for each 100 parts by weight water.

27. The method according to claim 26 wherein the concentrate is food product, the starch granules are characterized as exhibiting a loss of birefringency when dispersed in water at a temperature of less than 65°F. and weight ratio of starch granules to concentrate water ranges from about 1:2 to about 2:1.

28. A method for preparing a starch thickened product said method comprising:
  A. providing a concentrate comprised of:
    a. an internal phase of birefringent cold-water swelling starch granules, said starch granules characterized as exhibiting within 10 minutes a loss of birefringency when 1% by weight of the cold-water swelling starch is dispersed in water at a temperature of less than 120°F., and
    b. a continuous external phase of an aqueous dispersant with said aqueous dispersant comprising water and a starch swelling inhibitor,
  said concentrate being further characterized as containing at least one part by weight water for each six parts by weight starch granules with the amount and proportion of water and starch swelling inhibitor in said concentrate being sufficient to inhibit the cold-water swelling starch granules from thickening said concentrate, and
  B. uniformly admixing the concentrate with an additive which effectively dissipates the inhibitory effect of the aqueous dispersant upon the swelling capacity of the starch granules therein and thereby enables the starch granules to imbibe water and thicken the resultant concentrate-additive admixture.

29. The method according to claim 28 wherein the viscosity of product obtained from step B has a higher viscosity than the concentrate.

30. The method according to claim 28 wherein the additive uniformly admixed with the concentrate consists essentially of water.

31. The method according to claim 28 wherein the concentrate is edible and contains from about 20–30 percent by weight water, the external phase contains substantially all the desired recipe dry solids ingredients and the concentrate converts into a consumable starch thickened food product upon uniform admixture with an aqueous media containing from about one to about 10 parts by weight water for each part by weight concentrate.

32. The method according to claim 31 wherein the concentrate is a fluid concentrate which contains a weight ratio of cold-water soluble starch granules to water from about 1:3 to about 3:1, the concentrate thickens to a milk shake to pudding consistency upon uniformly admixing and hydration thereof with about 1 to about 6 parts by weight water for each part by weight concentrate at a mixing temperature from about 35°F. to about 65°F. and the concentrate contains more than about 200 parts by weight fermentable sugar for each 100 parts by weight concentrate water.

* * * * *

UNITED STATES PATENT AND TRADEMARK OFFICE
CERTIFICATE OF CORRECTION

PATENT NO. : 3,949,104
DATED : April 6, 1976
INVENTOR(S) : Hsiung Cheng and Carl O. Moore It is certified that error appears in the above-identified patent and that said Letters Patent are hereby corrected as shown below:

Column 3, bridging lines 34 and 35, for "within 10 minutes within 10 minutes" read ---within 10 minutes---
Column 6, bridging lines 34 and 35, for "methyl propionate, ethyl propionate, ethyl butyrate, octyl acetate," read ---methyl propionate, ethyl butyrate, octyl acetate,---
Column 15, line 37, for "fermentable for" read ---fermentable sugar for---

Signed and Sealed this

Third Day of August 1976

[SEAL]

Attest:

RUTH C. MASON
*Attesting Officer*

C. MARSHALL DANN
*Commissioner of Patents and Trademarks*